US008160738B2

(12) United States Patent
Nishikawa et al.

(10) Patent No.: US 8,160,738 B2
(45) Date of Patent: Apr. 17, 2012

(54) APPARATUS FOR AND METHOD OF MEASURING WORKPIECE ON MACHINE TOOL

(75) Inventors: Shizuo Nishikawa, Nara (JP); Hisayoshi Morita, Nara (JP); Masami Yabuta, Nara (JP); Sosuke Sakamoto, Nara (JP)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 233 days.

(21) Appl. No.: 12/713,660

(22) Filed: Feb. 26, 2010

(65) Prior Publication Data
US 2010/0241267 A1 Sep. 23, 2010

(30) Foreign Application Priority Data
Mar. 20, 2009 (JP) ................. 2009-069206

(51) Int. Cl.
*G06F 19/00* (2006.01)
*G05B 19/29* (2006.01)
(52) U.S. Cl. ......... 700/195; 700/170; 700/193; 318/603
(58) Field of Classification Search .................. 700/159, 700/169, 170, 173, 186, 193, 195; 318/560, 318/567, 569, 600, 603; 451/1, 5; 82/118
See application file for complete search history.

(56) References Cited

U.S. PATENT DOCUMENTS

| | | | | | |
|---|---|---|---|---|---|
| 3,708,657 | A | * | 1/1973 | Kelling | 318/570 |
| 4,079,235 | A | * | 3/1978 | Froyd et al. | 700/169 |
| 4,095,157 | A | * | 6/1978 | Klauser | 318/603 |
| 4,602,540 | A | * | 7/1986 | Murofushi et al. | 82/118 |
| 4,626,756 | A | * | 12/1986 | Inaba et al. | 318/573 |
| 4,810,945 | A | * | 3/1989 | Yoneda et al. | 318/571 |
| 4,873,793 | A | * | 10/1989 | Asano et al. | 451/5 |
| 5,144,214 | A | * | 9/1992 | Komatsu et al. | 318/600 |
| 5,270,942 | A | * | 12/1993 | Reed | 700/195 |
| 5,411,430 | A | * | 5/1995 | Nishimura et al. | 451/1 |
| 5,739,660 | A | * | 4/1998 | Gnann | 318/626 |
| 7,973,509 | B2 | * | 7/2011 | Hosokawa et al. | 318/569 |

FOREIGN PATENT DOCUMENTS

| | | |
|---|---|---|
| JP | 2007-518579 A1 | 7/2007 |
| WO | WO 2005/065884 A2 | 7/2005 |

OTHER PUBLICATIONS

Juanjuan Tian et al., "A new method of generating command pulses for numerical controller -with velocity and acceleration bounds adapting to servomotor system", International Conference on Mechatronics and Automation, Publication Year: 2009, pp. 274-279.*

* cited by examiner

*Primary Examiner* — Crystal J Barnes-Bullock
(74) *Attorney, Agent, or Firm* — Kratz, Quintos & Hanson, LLP

(57) ABSTRACT

A workpiece measuring apparatus includes a programmable controller which acquires positional data of a measuring head. At the same time that the programmable controller acquires the positional data, a pulse output unit outputs timing pulses. The measuring head measures a workpiece on a machine tool according to a measurement command which is output positively earlier than the timing of predetermined time intervals by a time difference which is preset by a predictive system. As a result, a first time at which the programmable controller acquires the positional data of the measuring head and a second time at which the measuring head measures the workpiece in response to the measurement command synchronize. The workpiece measuring apparatus is capable of measuring the workpiece highly accurately in a three-dimensional space according to a minimum required amount of measured data without the need for modifying an existing NC apparatus combined with the machine tool.

11 Claims, 12 Drawing Sheets

FIG.8

| MEASURED DISTANCE D | POSITIONAL DATA C1 IN THREE MUTUALLY TRANSVERSE AXES DIRECTIONS ||| COORDINATES OF MEASURED POINTS S |||
|---|---|---|---|---|---|---|
| | POSITION IN X-AXIS DIRECTIONS | POSITION IN Y-AXIS DIRECTIONS | POSITION IN Z-AXIS DIRECTIONS | X-AXIS DIRECTIONS | Y-AXIS DIRECTIONS | Z-AXIS DIRECTIONS |
| 50.010 | 0 | 0 | 60.000 | 0 | 0 | 9.990 |
| 49.998 | 1.736 | 0 | 59.848 | 1.736 | 0 | 9.850 |
| 50.003 | 3.420 | 0 | 59.397 | 3.420 | 0 | 9.394 |
| 50.012 | 5.000 | 0 | 58.660 | 5.000 | 0 | 8.648 |
| -------- | -------- | -------- | -------- | -------- | -------- | -------- | the workpiece positively at all times with identical timing and at constant time intervals.

APPARATUS FOR AND METHOD OF MEASURING WORKPIECE ON MACHINE TOOL

BACKGROUND OF THE INVENTION

1. Field of the Invention

The present invention relates to an apparatus for and a method of measuring a workpiece on a machine tool with a measuring head which is detachably mounted on a main spindle of the machine tool.

2. Description of the Related Art

In the field of machine tools such as machining centers, there has already been proposed a technology for measuring the configuration of a surface of a machined workpiece mounted on a machine tool without the need for removal of the machined workpiece from the machine tool. For example, PC(WO) 2007-518579 discloses a workpiece inspection system for use with machine tools.

The disclosed workpiece inspection system includes a probe, which corresponds to a measuring head according to the present invention, mounted on a main spindle of a machine tool. When the feeler of the probe contacts a workpiece on the machine tool, the workpiece inspection system measures the workpiece with the probe and acquires measured data from the probe. At the same time, an existing NC (Numerical Control) apparatus combined with the machine tool acquires positional data of the probe. The workpiece inspection system then inspects the workpiece based on a combination of the measured data and the positional data.

The workpiece inspection system disclosed in PC(WO) 2007-518579 makes it necessary to modify or change the existing NC apparatus for adding new functions thereto. The probe outputs a much larger number of measured data than positional data acquired by the NC apparatus. The disclosed workpiece inspection system selects a necessary number of measured data from the large number of measured data output by the probe. As a result, the measured data tend to be brought out of synchronism with the positional data, making the workpiece inspection system difficult to produce highly accurate inspection results.

Since the number of generated measured data is large, the overall data to be handled are enormous. As a consequence, the disclosed workpiece inspection system requires an interface having a large processing capability for transmitting the measured data and a CPU having a large processing capability for processing the measured data. The workpiece inspection system also needs a memory having a large storage capacity for storing the measured data.

The disclosed workpiece inspection system operates to acquire measured data while the feeler of the probe is being held in contact with the workpiece. Therefore, it is difficult to scan the workpiece with the probe safely at a high speed in a vibration-free or low-vibration environment. It is also difficult to measure the workpiece over a wide surface range thereof within a short period of time.

SUMMARY OF THE INVENTION

It is an object of the present invention to provide an apparatus for and a method of measuring a workpiece on a machine tool highly accurately in a two-dimensional or three-dimensional space by acquiring positional data in at least biaxial directions of a measuring head with respect to measured points on the workpiece and measuring the workpiece with the measuring head, repeatedly with identical timing at all times and at constant time intervals, and then processing a minimum required number of measured data, without modifying or changing an NC apparatus combined with the machine tool for adding new functions thereto.

To achieve the above object, there is provided in accordance with the present invention a workpiece measuring apparatus for measuring a workpiece on a machine tool, comprising: a numerical control apparatus for controlling the machine tool; a measuring head detachably mounted on a main spindle of the machine tool, for measuring the workpiece on the machine tool; a transceiver for sending and receiving signals and data between itself and the measuring head; and a control device for controlling the workpiece measuring apparatus; wherein the workpiece measuring apparatus comprises: a programmable controller for acquiring positional data of the measuring head, with respect to measured points on the workpiece, in at least two-axis directions including a first axis direction and a second axis direction, along which the measuring head scans the workpiece, at predetermined time intervals from the numerical control apparatus; and a pulse output unit for outputting timing pulses at pulse intervals corresponding to the predetermined time intervals to the transceiver; wherein the programmable controller acquires the positional data of the measuring head; the pulse output unit outputs the timing pulses at the same time that the programmable controller acquires the positional data of the measuring head; and the measuring head measures the workpiece according to a measurement command which is output positively earlier than the timing of the predetermined time intervals by a time difference which is preset by a predictive system and which is kept in timed relation to the timing pulses; whereby a first time at which the programmable controller acquires the positional data of the measuring head and a second time at which the measuring head measures the workpiece in response to the measurement command synchronize.

There is provided in accordance with the present invention a workpiece measuring apparatus for measuring a workpiece on a machine tool, comprising: a numerical control apparatus for controlling the machine tool; a measuring head detachably mounted on a main spindle of the machine tool, for measuring the workpiece on the machine tool; a transceiver for sending and receiving signals and data between itself and the measuring head; and a control device for controlling the workpiece measuring apparatus; wherein the workpiece measuring apparatus comprises: a programmable controller for acquiring positional data of the measuring head, with respect to measured points on the workpiece, in at least two-axis directions including a first axis direction and a second axis direction, along which the measuring head scans the workpiece, at predetermined time intervals from the numerical control apparatus; and a pulse output unit for outputting timing pulses at pulse intervals corresponding to the predetermined time intervals to the transceiver; wherein the programmable controller acquires the positional data of the measuring head; the pulse output unit outputs the timing pulses at the same time that the programmable controller acquires the positional data of the measuring head; the measuring head measures the workpiece according to a measurement command which is output positively earlier than the timing of the predetermined time intervals by a time difference which is preset by a predictive system and which is kept in timed relation to the timing pulses; whereby a first time at which the programmable controller acquires the positional data of the measuring head and a second time at which the measuring head measures the workpiece in response to the measurement command synchronize, so that the programmable controller acquires the positional data and the measuring head measures the workpiece, at the time of the acquisition of the positional data by the programmable controller, repeatedly with identical timing at all times and at the predetermined time intervals; the programmable controller outputs the positional data of the measuring head acquired thereby to the control device; the transceiver receives measured data from the measuring head after the transceiver has transmitted the measurement command to the measuring head, and outputs the received measured data to the control device; and the control device processes the positional data and the measured data to generate two-dimensional or three-dimensional shape data of the workpiece.

Preferably, the programmable controller includes a buffer memory for temporarily storing the positional data of the measuring head. When the programmable controller acquires the positional data of the measuring head, the programmable controller temporarily stores the positional data into the buffer memory and thereafter outputs the positional data from the buffer memory to the control device.

Preferably, the control device comprises: a measured data storage unit for storing the measured data; a positional data storage unit for successively reading the positional data acquired by the programmable controller and stored in the buffer memory, according to commands from a start address memory included in the control device and commands from a counter included in the buffer memory, and for storing the positional data successively read from the buffer memory; and a processor for processing the measured data stored in the measured data storage unit and the positional data stored in the positional data storage unit.

Preferably, the measuring head measures a distance from the measuring head to the workpiece for thereby measuring the workpiece in noncontact therewith in response to the measurement command.

Preferably, the predictive system is included in the transceiver or the measuring head.

Preferably, the machine tool comprises a multi-axis turning center for performing a three-axis control process for linearly moving the measuring head and the workpiece in the three mutually transverse axes directions relatively to each other, and at least one-axis control process for swiveling and indexing the measuring head and the workpiece relatively to each other.

Preferably, the measuring head measures the workpiece when the workpiece is inclined to a central axis of the measuring head.

Preferably, the measuring head is automatically changeable on the main spindle by an automatic tool changer; and while the workpiece is being machined by a tool mounted on the main spindle or after the workpiece is machined by a tool mounted on the main spindle, the tool is replaced with the measuring head and the workpiece is measured by the measuring head 8, or after the workpiece is measured by the measuring head, the measuring head is replaced with a tool and the workpiece is machined by the tool, so that a machining process on the workpiece is followed by a measuring process on the workpiece, or vice versa.

To achieve the above object, there is provided in accordance with the present invention a method of measuring a workpiece with a workpiece measuring apparatus, the workpiece measuring apparatus comprising: a numerical control apparatus for controlling a machine tool; a measuring head detachably mounted on a main spindle of the machine tool, for measuring the workpiece on the machine tool; a transceiver for sending and receiving signals and data between itself and the measuring head; a control device for controlling the workpiece measuring apparatus; a programmable controller for acquiring positional data of the measuring head, with respect to measured points on the workpiece, in at least two-axis directions including a first axis direction and a second axis direction, along which the measuring head scans the workpiece, at predetermined time intervals from the numerical control apparatus; and a pulse output unit for outputting timing pulses at pulse intervals corresponding to the predetermined time intervals to the transceiver, the method comprising the steps of: acquiring the positional data of the measuring head with the programmable controller; outputting the timing pulses from the pulse output unit at the same time that the programmable controller acquires the positional data of the measuring head; and measuring the workpiece with the measuring head according to a measurement command which is output positively earlier than the timing of the predetermined time intervals by a time difference which is preset by a predictive system and which is kept in timed relation to the timing pulses; whereby a first time at which the programmable controller acquires the positional data of the measuring head and a second time at which the measuring head measures the workpiece in response to the measurement command synchronize.

There is provided in accordance with the present invention a method of measuring a workpiece with a workpiece measuring apparatus, the workpiece measuring apparatus comprising: a numerical control apparatus for controlling a machine tool; a measuring head detachably mounted on a main spindle of the machine tool, for measuring the workpiece on the machine tool; a transceiver for sending and receiving signals and data between itself and the measuring head; a control device for controlling the workpiece measuring apparatus; a programmable controller for acquiring positional data of the measuring head, with respect to measured points on the workpiece, in at least two-axis directions including a first axis direction and a second axis direction, along which the measuring head scans the workpiece, at predetermined time intervals from the numerical control apparatus; and a pulse output unit for outputting timing pulses at pulse intervals corresponding to the predetermined time intervals to the transceiver, the method comprising the steps of: acquiring the positional data of the measuring head with the programmable controller; outputting the timing pulses from the pulse output unit at the same time that the programmable controller acquires the positional data of the measuring head; measuring the workpiece with the measuring head according to a measurement command which is output positively earlier than the timing of the predetermined time intervals by a time difference which is preset by a predictive system and which is kept in timed relation to the timing pulses; whereby a first time at which the programmable controller acquires the positional data of the measuring head and a second time at which the measuring head measures the workpiece in response to the measurement command synchronize, so that the programmable controller acquires the positional data and the measuring head measures the workpiece at the time of the acquisition of the positional data by the programmable controller, repeatedly with identical timing at all times and at the predetermined time intervals; outputting the positional data acquired by the programmable controller to the control device; receiving measured data from the measuring head with the transceiver after the transceiver has transmitted the measurement command to the measuring head, and outputting the received measured data to the control device; and processing the positional data and the measured data with the control device to generate two-dimensional or three-dimensional shape data of the workpiece.

The apparatus and the method, arranged as described above, according to the present invention are capable of measuring a workpiece on a machine tool highly accurately in a two-dimensional or three-dimensional space, by acquiring positional data in at least biaxial directions of a measuring head with respect to measured points on the workpiece and by measuring the workpiece with the measuring head at the time of the acquisition of the positional data, repeatedly with identical timing at all times and at constant time intervals, and then processing a minimum required number of measured data, without modifying or changing an NC apparatus combined with the machine tool for adding new functions thereto.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 8 is a table of measured data and positional data input to a control device and coordinate data calculated by the control device;

DESCRIPTION OF THE PREFERRED EMBODIMENT

Figure 1:
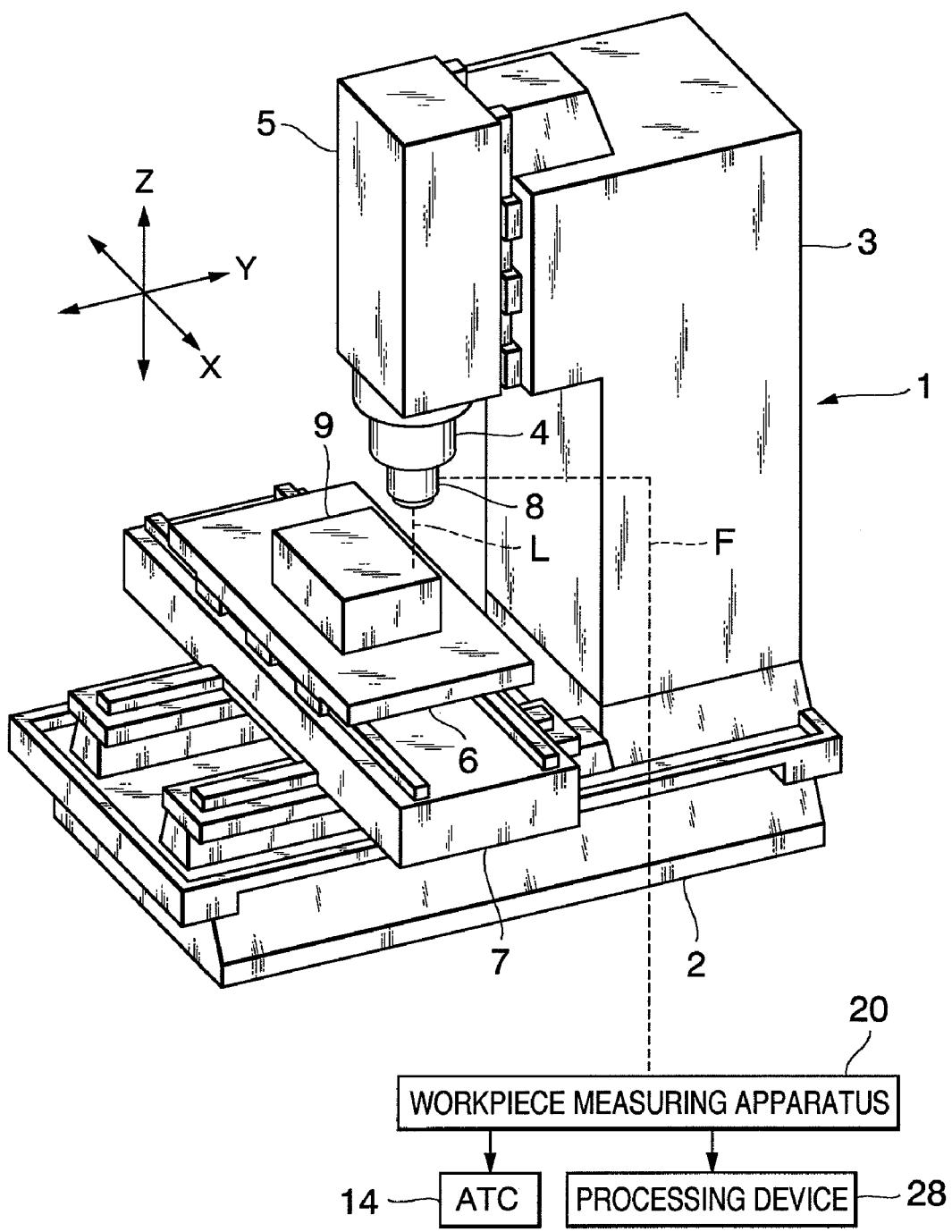
FIG. 1 is a perspective view of a machine tool combined with a workpiece measuring apparatus according to an embodiment of the present invention.

A workpiece measuring apparatus according to the present invention includes a programmable controller which acquires positional data of a measuring head. In synchronism with the acquisition of the positional data, a pulse output unit outputs a timing pulse. The measuring head measures a workpiece on a machine tool in response to a measurement command which is output positively earlier than the timing of a certain time interval by a time difference which is preset by a predictive system. The measurement command is kept in timed relation to the timing pulse.

In this manner, a first time at which the programmable controller acquires the positional data of the measuring head and a second time at which the measuring head measures the workpiece in response to the measurement command synchronize.

The programmable controller acquires the positional data in at least biaxial directions of the measuring head with respect to measured points on the workpiece. The measuring head measures the workpiece at the time of the acquisition of the positional data by the programmable controller. The positional data are acquired and the workpiece is measured repeatedly with identical timing at all times and at constant time intervals.

Consequently, the workpiece measuring apparatus can measure the workpiece on the machine tool highly accurately in a two-dimensional or three-dimensional space by processing a minimum required number of measured data, without modifying or changing an NC apparatus combined with the machine tool for adding new functions thereto.

In preferred embodiments to be described below, the machine tool comprises a vertical machining center or a five-axis turning center. The machine tool may alternatively comprise a horizontal machining center, a lathe, a turning machine or a grinding machine.

Like or corresponding parts are denoted by like or corresponding reference characters throughout views.

Preferred embodiments of the present invention will hereinafter be described in detail below with reference to FIGS. 1 through 10F.

Figure 2:
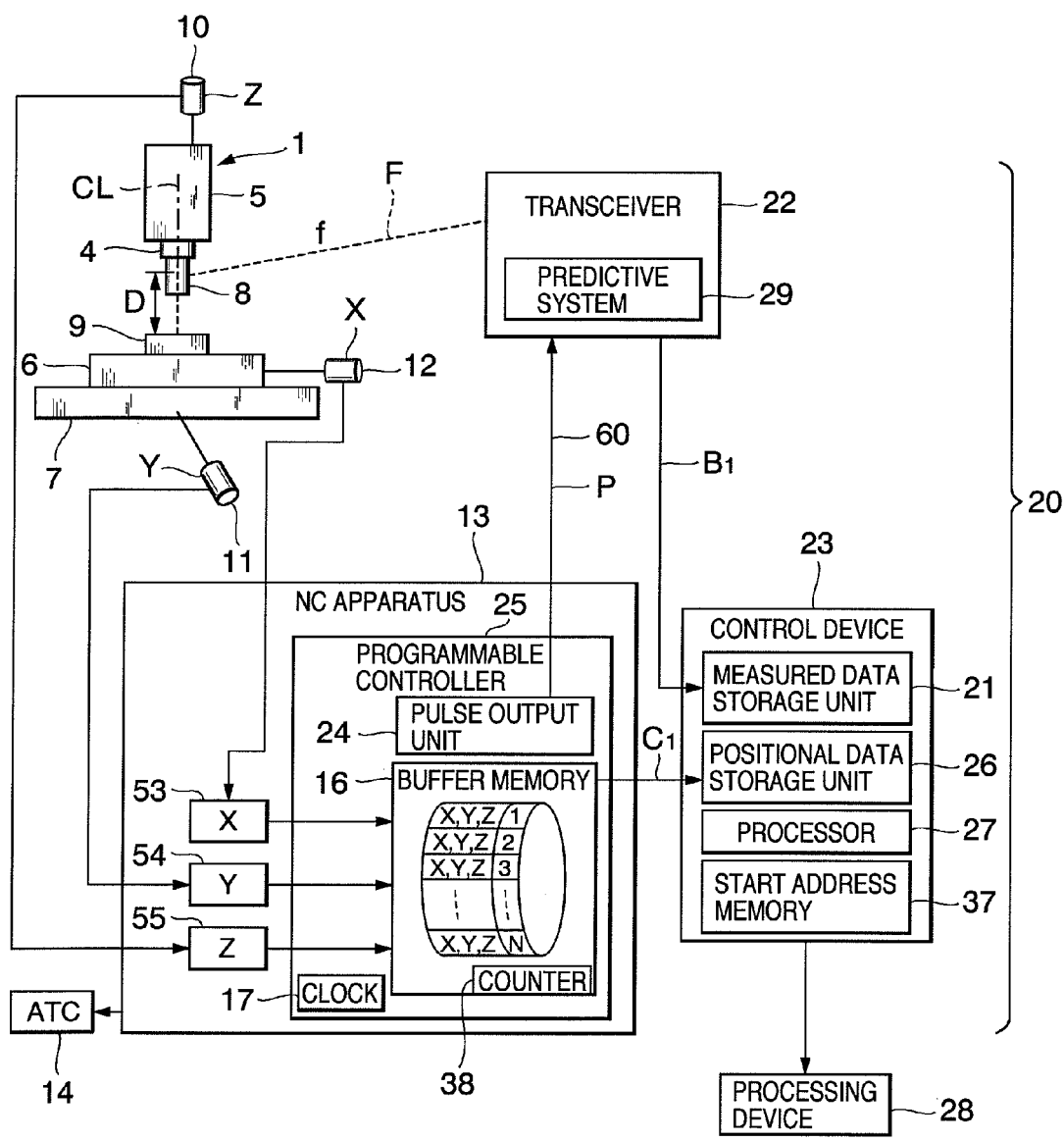
FIG. 2 is a detailed block diagram of the workpiece measuring apparatus.
Figure 3:
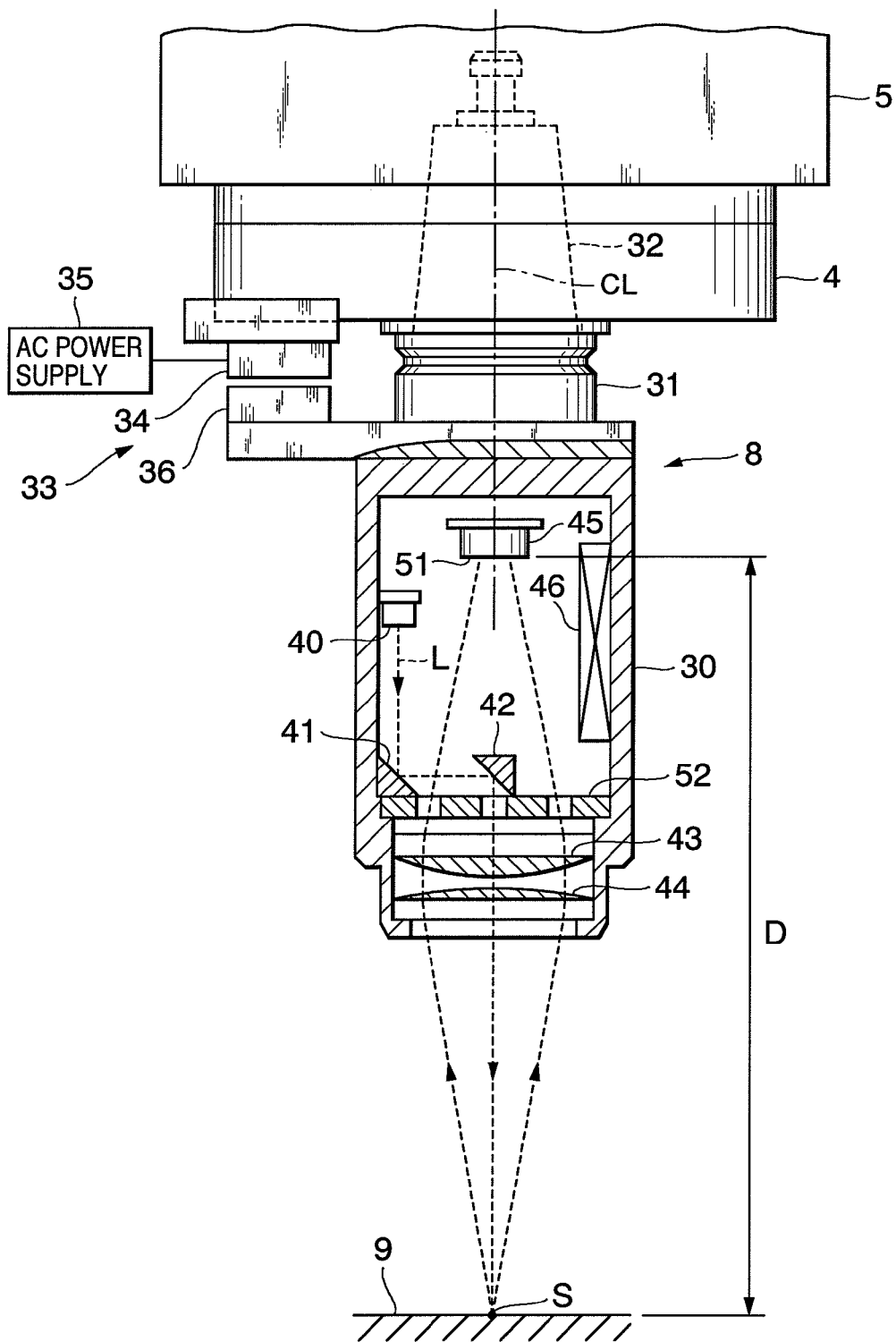
FIG. 3 is a vertical cross-sectional view of a portion of a measuring head of the workpiece measuring apparatus which is mounted on a main spindle of the machine tool.
Figure 4:
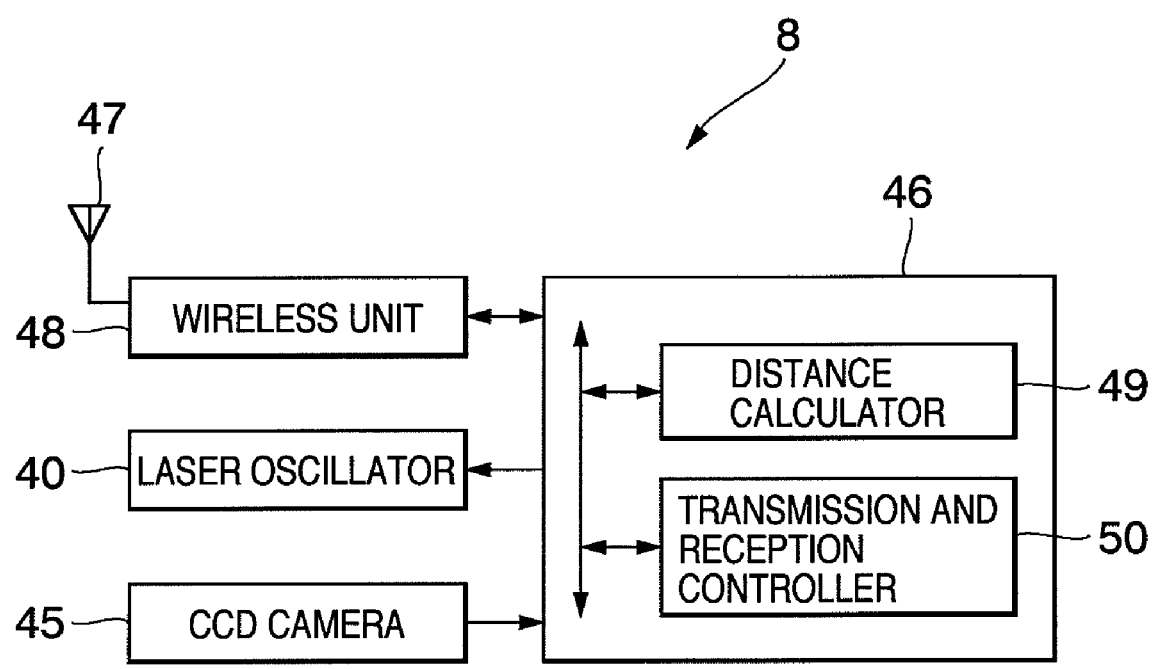
FIG. 4 is a block diagram of the measuring head.
Figure 5:
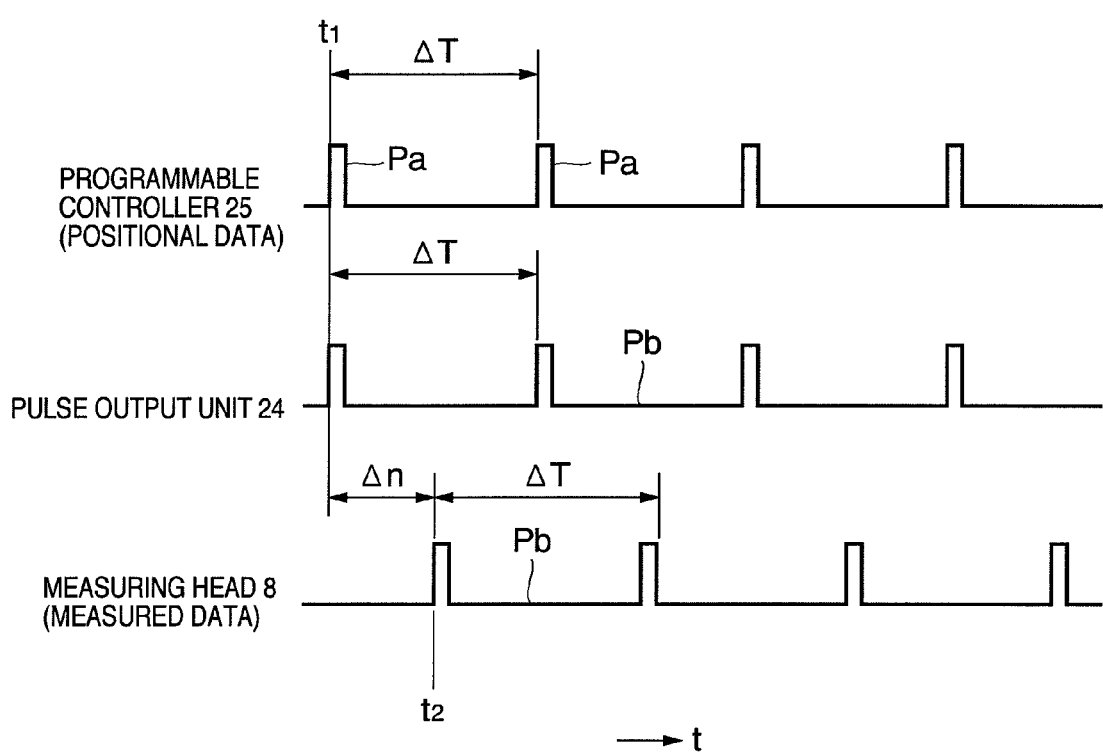
FIG. 5 is a diagram of waveforms of signals illustrative of the principles of the present invention.

FIGS. 1 through 8 show a workpiece measuring apparatus according to an embodiment of the present invention. FIG. 1 is a perspective view of a machine tool combined with the workpiece measuring apparatus according to the embodiment of the present invention. FIG. 2 is a detailed block diagram of the workpiece measuring apparatus. FIG. 3 is a vertical cross-sectional view of a portion of a measuring head of the workpiece measuring apparatus which is mounted on a main spindle of the machine tool. FIG. 4 is a block diagram of the measuring head. FIG. 5 is a diagram of waveforms of signals illustrative of the principles of the present invention.

Figure 6:
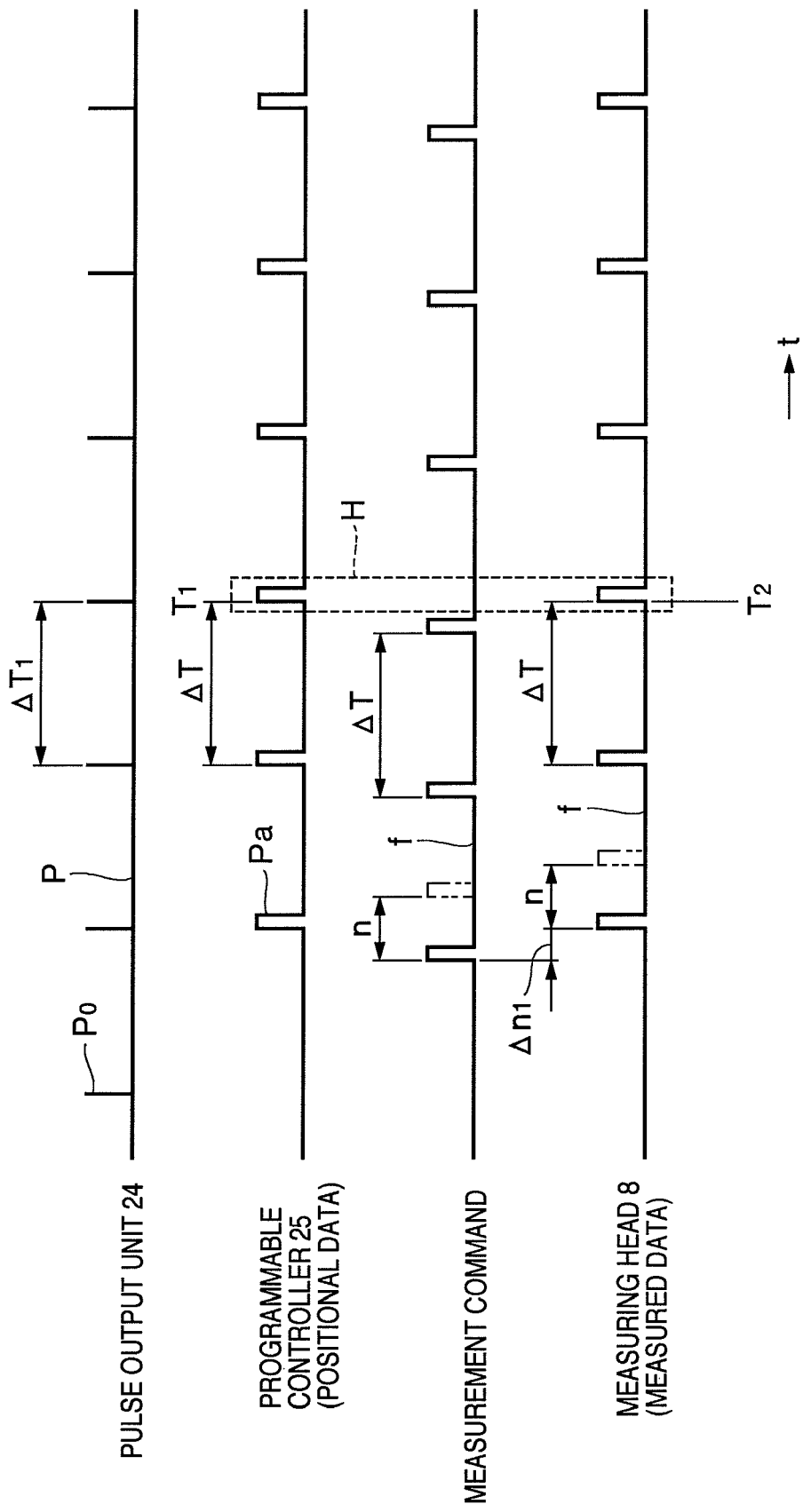
FIG. 6 is a diagram of waveforms of signals produced by the workpiece measuring apparatus.
Figure 7:
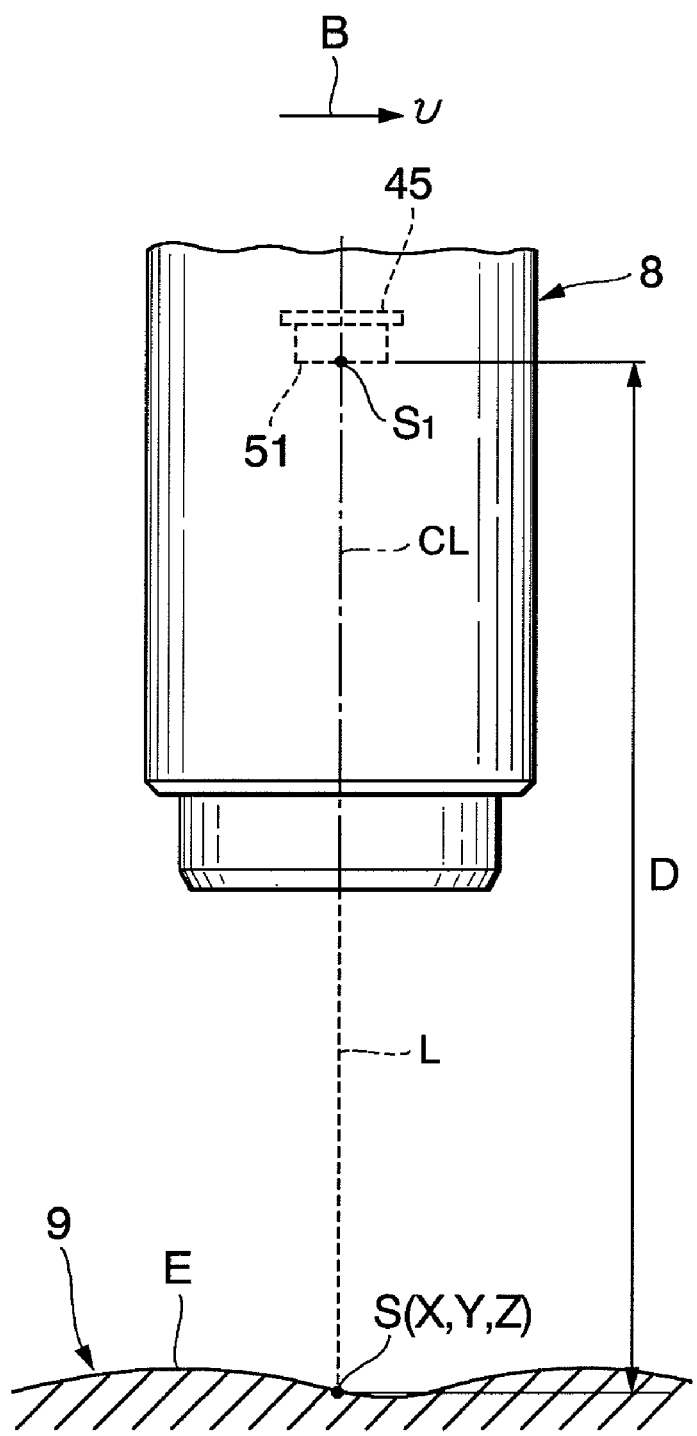
FIG. 7 is an elevational view showing a mode of operation in which the measuring head measures a workpiece.

FIG. 6 is a diagram of waveforms of signals produced by the workpiece measuring apparatus. FIG. 7 is an elevational view showing a mode of operation in which the measuring head measures a workpiece. FIG. 8 is a table of measured data and positional data input to a control device and coordinate data calculated by the control device.

As shown in FIGS. 1 and 2, the machine tool 1 comprises a vertical machining center in the embodiment. The machine tool 1 includes a bed 2, a column 3 mounted on the bed 2, a spindle head 5 supported on the column 3 and including a main spindle 4, and a saddle 7 mounted on the bed 2 and including a table 6. The machine tool 1 is controlled by an NC (Numerical Control) apparatus 13 (see FIG. 2).

The machine tool 1 is set in a three-dimensional space having an X-axis, a Y-axis and a Z-axis which lie perpendicularly to each other. The X-axis extends horizontally in transverse directions of the machine tool 1 and is also referred to as X-axis directions. The Y-axis extends horizontally in longitudinal directions of the machine tool 1 and is also referred to as Y-axis directions. The Z-axis extends vertically and is also referred to as Z-axis directions. Three mutually transverse axes directions comprise the X-axis, the Y-axis and the Z-axis.

The spindle head 5 is supported on a front surface of the column 3 for vertical movement thereon in vertical directions, i.e., the Z-axis directions. A tool, not shown, or a measuring head 8 is detachably mounted on a lower distal end of the main spindle 4. The main spindle 4 is supported on the spindle head 5 for rotation about its own central axis which extends parallel to the Z-axis.

The saddle 7 is movably disposed on the bed 2 for horizontal movement along the Y-axis in the longitudinal directions of the machine tool 1. The table 6 is movably mounted on the saddle 7 for horizontal movement along the X-axis in the transverse directions of the machine tool 1. A workpiece 9 to be machined by the machine tool 1 is securely disposed on the table 6.

The spindle head 5 supported on the column 3 is movable in the Z-axis directions when the spindle head 5 is actuated by a Z-axis feed mechanism 10. The saddle 7 disposed on the bed 2 is movable in the Y-axis directions when the saddle 7 is actuated by a Y-axis feed mechanism 11. The table 6 disposed on the saddle 7 and supporting the workpiece 9 is movable in the X-axis directions when the table 6 is actuated by an X-axis feed mechanism 12. These Z-axis, Y-axis and X-axis feed mechanisms 10, 11 and 12 comprise servomotors, respectively.

The NC apparatus 13 controls the Z-axis feed mechanism 10, the Y-axis feed mechanism 11 and the X-axis feed mechanism 12. The NC apparatus 13 also controls an ATC (Automatic Tool Changer) 14 for automatically changing the tool and the measuring head 8 on the main spindle 4.

The machine tool 1 serves as a three-axis control machining center for linearly moving the measuring head 8 and the workpiece 9 relatively to each other along the three mutually transverse axes directions (i.e., the X-axis, the Y-axis and the Z-axis). Alternatively, the machine tool 1 may be constructed to move the spindle head 5 which supports the measuring head 8 relatively to the workpiece 9 along the X-axis and the Y-axis.

As shown in FIGS. 1 through 8, the workpiece measuring apparatus 20 and a workpiece measuring method which is carried out by the workpiece measuring apparatus 20 make it possible to measure the workpiece 9 with the measuring head 8 which is detachably mounted on the main spindle 4 of the machine tool 1 while the workpiece 9 and the measuring head 8 are being kept in noncontact with each other (or while they are being kept in contact with each other).

The workpiece measuring apparatus 20 includes the NC apparatus 13, for controlling the machine tool 1, and the measuring head 8 which is detachably mounted on the main spindle 4 of the machine tool 1 and which measures the workpiece 9. The workpiece measuring apparatus 20 has a transceiver 22 for transmitting and receiving signals and data between itself and the measuring head 8, and a control device 23, e.g., a personal computer, for controlling the workpiece measuring apparatus 20.

The workpiece measuring apparatus 20 also has a pulse output unit 24 and a programmable controller 25 (hereinafter referred to as "controller 25") for controlling the machine tool 1.

The controller 25 is included in the NC apparatus 13. The controller 25 may comprise, for example, a PMC (Programmable Machine Controller), a PLC (Programmable Logic Controller), or the like. The controller 25 may be separate from the NC apparatus 13.

The controller 25 reads and acquires positional data of the measuring head 8 from the NC apparatus 13 at each of constant time intervals $\Delta T$. The positional data of the measuring head 8, with respect to a measured point S (see FIG. 3) on the workpiece 9, represent the data of a position in at least two-axis directions including a first axis direction (Z-axis direction) and a second axis direction (X-axis direction) along which the measuring head 8 scans the measured point S on the workpiece 9. The position in the two-axis directions usually refers to a position at which the Z-axis and X-axis directions lie perpendicularly to each other. However, the two-axis directions at such a position may not lie perpendicularly to each other.

The controller 25 includes a clock 17 for outputting a regular signal at each of the constant time intervals $\Delta T$. The controller 25 reads and acquires positional data of the measuring head 8 from the NC apparatus 13 according to the signal output from the clock 17.

The pulse output unit 24, which is included in the controller 25, outputs timing pulses P to the transceiver 22.

The pulse output unit 24 outputs the timing pulses P at pulse intervals $\Delta T1$, each from one pulse to a next pulse, which correspond to the time intervals $\Delta T$ of the signal output from the clock 17, over a cable 60 to the transceiver 22. The timing pulses P refer to pulses for timing circuit operations. In the present embodiment, the timing pulses P are used to time the transceiver 22.

In the present embodiment, each of the time intervals $\Delta T$ of the signal output from the clock 17 is of 16 milliseconds (msec.), and each of the pulse intervals $\Delta T1$ of the timing pulses P should preferably be basically of 16 msec. In the illustrated embodiment, each of the time intervals $\Delta T$ and each of the pulse intervals $\Delta T1$ are equal to each other.

For measuring the workpiece 9 with the workpiece measuring apparatus 20, the controller 25 reads and acquires positional data of the measuring head 8 from the NC apparatus 13. In the present embodiment, the controller 25 acquires positional data of the measuring head 8 in the three mutually transverse axes directions, i.e., the X-, Y- and Z-axis directions with respect to the measured point S on the workpiece 9. The positional data of the measuring head 8 represent the data of a central position S1 on an image-capturing surface 51 (FIG. 3) of a CCD (Charge-Coupled Device) camera 45, to be described later, which is incorporated in the measuring head 8.

In synchronism with the acquisition of the positional data by the controller 25, the pulse output unit 24 outputs timing pulses P over the cable 60 to the transceiver 22.

A signal F representing a measurement command f and a signal F representing measured data are sent and received through a wireless link between the transceiver 22 and the measuring head 8 which is mounted on the main spindle 4.

When the transceiver 22 receives the timing pulse P from the pulse output unit 24, the transceiver 22 sends the signal F representing the measurement command f to the measuring head 8. The measurement command f is a command which is output positively earlier than the timing of a time interval $\Delta T$ by a time difference n which is preset by a predictive system 29. The measurement command f is kept in timed relation to the timing pulse P.

The predictive system 29 is incorporated in the transceiver 22. However, the predictive system 29 may be incorporated in the measuring head 8 or may be separate from the transceiver 22.

Alternatively, the pulse output unit 24 may be incorporated in the transceiver 22, and the predictive system 29 may be incorporated in the measuring head 8. According to this alternative, when the pulse output unit 24 outputs timing pulses P as a signal F to the measuring head 8, the predictive system 29 of the measuring head 8 generates a measurement command f based on the timing pulses P and the measuring head 8 measures the workpiece 9 according to the measurement command f.

The measuring head 8 measures a distance D from the measuring head 8 to the workpiece 9 when the signal F representing the measurement command f is output to the measuring head 8. The measuring head 8 then sends the signal F representing the measured data to the transceiver 22 through the wireless link. The transceiver 22 outputs measured data B1, which are representative of the distance D, received from the measuring head 8 to the control device 23.

As a result, a first time T1 at which the controller 25 reads and acquires the positional data C1 of the measuring head 8 and a second time T2 at which the measuring head 8 measures the workpiece 9 in response to the measurement command f synchronize, as shown at H in FIG. 6.

The first time T1 is a time at which the controller 25 acquires, at each time interval ΔT from the NC apparatus 13, positional data in at least two-axis directions of the measuring head 8 with respect to the measured point S on the workpiece 9. The first time T1 does not occur as a single time, but occurs at each time interval ΔT.

The second time T2 is a time at which the measuring head 8 measures the distance D from the measuring head 8 to the workpiece 9 at each time interval ΔT according to the measurement command f. The second time T2 does not occur as a single time, but occurs at each time interval ΔT.

Consequently, the controller 25 acquires the positional data C1 and the measuring head 8 measures the workpiece 9, at the time of the acquisition of the positional data C1 by the controller 25, repeatedly with identical timing, i.e., simultaneously, at all times and at predetermined time intervals ΔT.

In other words, the controller 25 reads and acquires the positional data C1 in at least two-axis directions (Z-axis and X-axis directions) of the measuring head 8 with respect to the measured point S on the workpiece 9, from the NC apparatus 13.

Simultaneously with the above operation of the controller 25 and at each time interval ΔT, the measuring head 8 measures the distance D from the measuring head 8 to the workpiece 9 at the time.

The positional data C1, of the measuring head 8, which is acquired by the controller 25 are output to the control device 23. After the transceiver 22 has sent the measurement command f to the measuring head 8, the transceiver 22 outputs the measured data B1 received from the measuring head 8 to the control device 23.

The control device 23 processes the positional data C1 and the measured data B1 to produce two-dimensional or three-dimensional shape data of the workpiece 9.

With the workpiece measuring apparatus 20 and the workpiece measuring method which is carried out by the apparatus 20, it is not necessary to modify or change the NC apparatus 13 for adding new functions thereto. The controller 25 acquires the positional data C1 in at least two-axis directions (Z-axis and X-axis directions) of the measuring head 8 with respect to the measured point S on the workpiece 9, from the NC apparatus 13, and the measuring head 8 measures the workpiece 9 at the time repeatedly with identical timing at all times and at the time intervals ΔT.

As a result, the control device 23 can measure the workpiece 9 highly accurately in a two-dimensional or three-dimensional space by processing the measured data B1 which are given as a minimum required number of measured data.

The controller 25 includes a buffer memory 16 for temporarily storing the positional data C1, of the measuring head 8, which is read from the NC apparatus 13.

When the controller 25 acquires the positional data C1 of the measuring head 8, the controller 25 temporarily stores the positional data C1 in the buffer memory 16 and thereafter outputs the positional data C1 from the buffer memory 16 to the control device 23.

The control device 23 comprises a measured data storage unit 21 for storing the measured data B1, a positional data storage unit 26 for storing the positional data C1, and a processor 27.

The positional data storage unit 26 stores the positional data C1, in at least two-axis directions, which are acquired by the controller 25 and are temporarily stored in the buffer memory 16. The positional data storage unit 26 successively reads the positional data C1 and stores the positional data C1, which are thus read, according to a command output from a start address memory 37 included in the control device 23 and a command from a counter 38 included in the buffer memory 16. The two storage units 21, 26 may be separate from the control device 23.

The processor 27 processes the data of the distance D, i.e., the measured data B1, measured by the measuring head 8, and the data of the position, i.e., the positional data C1 of the measuring head 8, in at least two-axis directions acquired by the controller 25.

The controller 25 acquires the positional data C1 of the measuring head 8 from the NC apparatus 13 according to the signal which is output from the clock 17 at each of the constant time intervals ΔT, and thereafter outputs the positional data C1 to the control device 23.

The controller 25 includes the buffer memory 16 as described above. After the controller 25 acquires the positional data C1 of the measuring head 8 from the NC apparatus 13 in timed relation to the signal which is output from the clock 17 at each of the constant time intervals ΔT, the controller 25 temporarily stores the positional data C1 in the buffer memory 16. Thereafter, the controller 25 sends the positional data C1 from the buffer memory 16 to the positional data storage unit 26 of the control device 23, and the positional data C1 are stored therein.

The buffer memory 16 comprises a ring memory. The buffer memory 16 temporarily stores the position of the measuring head 8 (the positional data C1 of the measuring head 8 in the three mutually transverse axes directions, i.e., the X-, Y- and Z-axis directions), according to a command from the counter 38 in the controller 25.

Specifically, when the servomotor of the X-axis feed mechanism 12 is in operation, it generates present X-axis positional information (coordinate) 53. When the servomotor of the Y-axis feed mechanism 11 is in operation, it generates present Y-axis positional information (coordinate) 54. When the servomotor of the Z-axis feed mechanism 10 is in operation, it generates present Z-axis positional information (coordinate) 55. The present X-axis positional information 53, the Y-axis positional information 54, and the present Z-axis positional information 55 are output from the corresponding servomotors to the buffer memory 16, which temporarily stores them as the positional data C1.

More specifically, when the measuring head 8 measures a first measured point S on the workpiece 9, the controller 25 reads the present X-axis, Y-axis and Z-axis positional information 53, 54 and 55 of the measuring head 8 from the NC apparatus 13. At this time, the buffer memory 16 stores coordinates "X, Y, Z" as the present X-axis, Y-axis and Z-axis positional information 53, 54 and 55 at an address "1" of the buffer memory 16.

Then, when the measuring head 8 measures a second measured point S on the workpiece 9, the controller 25 reads the present X-axis, Y-axis and Z-axis positional information 53, 54 and 55 of the measuring head 8 from the NC apparatus 13. At this time, the buffer memory 16 stores next coordinates "X, Y, Z" as the present X-axis, Y-axis and Z-axis positional information 53, 54 and 55 at an address "2" of the buffer memory 16.

Similarly, when the measuring head 8 measures an Nth measured point S on the workpiece 9, the controller 25 reads the present X-axis, Y-axis and Z-axis positional information 53, 54 and 55 of the measuring head 8 from the NC apparatus 13. At this time, the buffer memory 16 stores coordinates "X, Y, Z" as the present X-axis, Y-axis and Z-axis positional information 53, 54 and 55 at an address "N" of the buffer memory 16.

In this manner, the N positional data C1 ranging from the 1st positional data to the Nth positional data of the measuring head 8 are temporarily successively stored in the buffer memory 16. Thereafter, the N positional data C1 or a predetermined number of positional data thereof are simultaneously stored in the positional data storage unit 26 of the control device 23.

The buffer memory 16 may be disposed in a place other than the controller 26, e.g., in another place in the NC apparatus 13. The buffer memory 16 may not be a ring memory, but an existing memory provided in the NC apparatus 13 or the controller 25 may be used as the buffer memory 16.

The control device 23 successively stores the measured data B1 sent from the transceiver 22 into the measured data storage unit 21. The positional data C1 stored in the buffer memory 16 are successively read therefrom and stored into the positional data storage unit 26 according to a command output from the start address memory 37 and a command from the counter 38 of the buffer memory 16.

The processor 27 processes the positional data C1 stored in the positional data storage unit 26 and the measured data B1 stored in the measured data storage unit 21, thereby generating two-dimensional or three-dimensional shape data of the workpiece 9.

According to the present embodiment, the predictive system 29 of the transceiver 22 positively advances the measurement command f for the measuring head 8 by the time difference n which is preset by the predictive system 29, and then outputs the advanced measurement command f to the measuring head 8.

Consequently, the controller 25 acquires the positional data C1 and the measuring head 8 measures the workpiece 9 repeatedly with identical timing, i.e., simultaneously, at all times and at constant time intervals $\Delta T$.

The measuring head 8 can be handled as a tool and can be stored in a tool magazine. The measuring head 8 can automatically be changed and detachably mounted on the main spindle 4 by the ATC 14 which is controlled by the NC apparatus 13.

While the workpiece 9 is being machined by a tool mounted on the main spindle 4 or after the workpiece 9 is machined by a tool mounted on the main spindle 4, the tool may be replaced with the measuring head 8 and the workpiece 9 may be measured by the measuring head 8. After the workpiece 9 is measured by the measuring head 8, the measuring head 8 may be replaced with a tool and the workpiece 9 may be machined by the tool. Therefore, a machining process on the workpiece 9 may be followed by a measuring process on the workpiece 9, or vice versa. In other words, the machining process and the measuring process may be performed in any combination on the workpiece 9.

Consequently, after the workpiece 9 is machined, the workpiece 9 does not need to be removed from the table 6 for measurement, but may remain mounted on the table 6 and may be measured by the measuring head 8 in a two-dimensional or three-dimensional space. After the workpiece 9 is measured, it may be machined again.

As shown in FIG. 3, the measuring head 8 comprises a housing 30 and a mount 31 fixed to the housing 30. The mount 31 has a shank 32 detachably mounted in the main spindle 4. The shank 32 can be clamped on and unclamped from the main spindle 4 by a clamping and unclamping mechanism, not shown.

The measuring head 8 is supplied with electric power through a contactless power feeder 33. The power feeder 33 comprises a primary feeding coil 34 attached to the main spindle 4, an AC power supply 35 for supplying an electric current to the primary feeding coil 34, and a secondary receiving coil 36 attached to the measuring head 8.

With the measuring head 8 detachably mounted on the main spindle 4, the primary feeding coil 34 and the secondary receiving coil 36 are spaced from each other by a given gap therebetween, i.e., are held in noncontact with each other in confronting relation.

When the AC power supply 35 applies an AC voltage to the primary feeding coil 34, it generates magnetic fluxes, inducing an electromotive force in the secondary receiving coil 36. In this manner, electric power is supplied from the primary feeding coil 34 to the secondary receiving coil 36. The electric power supplied to the secondary receiving coil 36 is supplied to various components in the measuring head 8.

The housing 30 accommodates therein a laser oscillator 40, a pair of prisms 41 and 42 each having a reflecting mirror, a pair of lenses 43, 44, a CCD (Charge Coupled Device) camera 45, and a measuring head control device 46.

As shown in FIGS. 3 and 4, the measuring head 8 also includes a wireless unit 48 having an antenna 47. The wireless unit 48, which is mounted on the housing 30, sends and receives the signals F representing the measurement command f and the measured data to and from the transceiver 22 through the wireless link.

The laser oscillator 40 generates a laser beam L to be applied to the surface of the workpiece 9. The CCD camera 45 detects the laser beam L reflected from the surface of the workpiece 9 and generates two-dimensional image data from the detected laser beam L. The lenses 43 and 44 focus the laser beam L reflected from the surface of the workpiece 9 onto an image capturing surface 51 of the CCD camera 45.

The laser beam L generated by the laser oscillator 40 is reflected by the prisms 41 and 42, passes through an aperture 52 and the lenses 43 and 44, and is applied to the measured point S on the surface of the workpiece 9.

The laser beam L is reflected from the measured point S, travels back through the lenses 44 and 43 and the aperture 2, and is focused to form an annular image on the image capturing surface 51 of the CCD camera 45.

The measuring head control device 46 comprises a distance calculator 49 for calculating the measured distance D and a transmission and reception controller 50.

The distance calculator 49 calculates the distance D from the measuring head 8 to the workpiece 9, based on the two-dimensional image data generated by the CCD camera 45. The distance D specifically refers to the distance between the measured point S on the workpiece 9 and the image capturing surface 51 of the CCD camera 45 along a central axis CL of the measuring head 8, i.e., along the Z-axis.

The transmission and reception controller 50 sends and receives commands and data to and from the transceiver 22 via the wireless unit 48. Specifically, when the signal F representative of the measurement command f is transmitted from the transceiver 22, the measurement command f is sent via the wireless unit 48 to the transmission and reception controller 50.

In response to the measurement command f, the transmission and reception controller 50 outputs signals to the laser oscillator 40 and the CCD camera 45 to start a measuring process. The laser oscillator 40 generates the laser beam L, which is applied to the workpiece 9. The laser beam L which is diffusely reflected from the measured point S on the workpiece 9 is detected by the CCD camera 45, which generates two-dimensional image data based on the detected laser beam L.

When the two-dimensional image data are sent to the distance calculator 49, the distance calculator 49 calculates the distance D based on the two-dimensional image data. The transmission and reception controller 50 transmits the signal F representative of the measured data including the calculated distance D to the transceiver 22 via the wireless unit 48.

In the present embodiment, the signal F representative of the measurement command f is sent from the transceiver 22 to the measuring head 8 through the wireless link. The measuring head 8 measures the distance D from the measuring head 8 to the workpiece 9 in a contactless fashion when the measuring head 8 receives the measurement command f.

As described above, the measuring head 8 is automatically changed and detachably mounted on the main spindle 4 by the ATC 14. During the measuring process, the measuring head 8 is kept in noncontact with the workpiece 9. The measuring head 8 can thus be moved to scan the workpiece 9 safely at a high speed in a vibration-free or low-vibration environment for measuring the workpiece 9 over a wide surface range thereof in a short period of time.

The principles of the present invention will be described below.

First, it is assumed for an easier understanding of the premises of the invention that the predictive system 29 is dispensed with in FIGS. 1, 2 and 5 and the following two conditions 1, 2 are satisfied. In FIG. 5, the horizontal axis represents time t.

Condition 1: The clock 17 of the controller 25 outputs a signal Pa for acquiring positional data of the measuring head 8 from the NC apparatus 13 at constant time intervals $\Delta T$. The signal Pa represents a succession of clock pulses spaced by the constant time intervals $\Delta T$. According to the signal Pa from the clock 17, the controller 25 reads and acquires positional data of the measuring head 8 from the NC apparatus 13 at time t1.

Condition 2: At the same time that the controller 25 acquires positional data of the measuring head 8, the pulse output unit 24 outputs a timing pulse Pb to the transceiver 22. Timing pulses Pb successively output from the pulse output unit 24 are spaced by constant time intervals which are equal to the constant time intervals $\Delta T$ of the signal Pa.

The timing pulse Pb is sent through the cable 60 to the transceiver 22, which processes the timing pulse Pb. Thereafter, the transceiver 22 sends the signal F representative of the measurement command f to the measuring head 8 via the wireless link. Therefore, the timing pulse Pb which is output from the pulse output unit 24 at time t1 is sent through the cable 60, the transceiver 22 and the wireless link as the signal F to the measuring head 8.

At time t2 immediately after the measurement command f reaches the measuring head 8, the measuring head 8 measures the distance D up to the workpiece 9 based on the measurement command f.

While the timing pulse Pb travels from the pulse output unit 24 to the measuring head 8, the timing pulse Pb goes through a path which includes the cable 60, the transceiver 22, and the signal F of the wireless link. As a result, a relatively long delay time is consumed after the pulse output unit 24 outputs the timing pulse Pb until the measuring head 8 measures the distance D.

A delay time $\Delta n$, which is consumed after the pulse output unit 24 outputs the timing pulse Pb at time t1 until the measuring head 8 measures the distance D at time t2, is calculated according to the following equation:

$$\Delta n = t2 - t1 \qquad (1)$$

The controller 25 reads and acquires the positional data of the measuring head 8 from the NC apparatus 13 at time t1 according to the signal Pa from the clock 17.

Specifically, the controller 25 acquires the data of the position in at least two-axis directions of the measuring head 8 with respect to the measured point S on the workpiece 9 at time t1. In the present embodiment, the controller 25 acquires positional data X, Y, Z in the three mutually transverse axes directions.

Since the clock 17 is incorporated in the controller 25 in the NC apparatus 13, the signal Pa from the clock 17 has essentially no delay time. Consequently, the controller 25 immediately acquires the positional data of the measuring head 8 from the NC apparatus 13 at time t1 according to the signal Pa from the clock 17.

The difference between the delay time $\Delta n$, which occurs when the measuring head 8 measures the distance D up to the workpiece 9, and the delay time (nil) which occurs when the controller 25 acquires the positional data of the measuring head 8 in the three mutually transverse axes directions, is calculated as a time difference n as a parameter according to the following equation:

$$n = \Delta n - 0 \qquad (2)$$

The time difference n, which is calculated according to the equations (1), (2) as described above, is of a value inherent in a system made up of the machine tool 1 and the measuring head 8 mounted thereon. The time difference n as the value inherent in the system is theoretically fixed unless the machine tool 1 and the measuring head 8 are partly modified or entirely replaced.

After the machine tool 1 is installed and the measuring head 8 to be used on the machine tool 1 is identified, the time difference n is determined in a single test process. Alternatively, each time machining conditions for the workpiece 9 are changed or the type of the workpiece 9 is changed, the time difference n may be confirmed or changed once or a plurality of times for setting itself to a more accurate value.

According to the present embodiment, the measurement command f is output positively earlier than the timing of the time intervals $\Delta T$ by the time difference n, and the measuring head 8 measures the workpiece 9 according to the advanced measurement command f, as shown in FIGS. 1, 2 and 6. In FIG. 6, the horizontal axis represents time t.

The time difference n is preset by the predictive system 29 in the transceiver 22, and stored in the predictive system 29.

The signal Pa output from the clock 17 is of the timing of the time intervals ΔT.

Therefore, the first time T1, at which the controller 25 acquires the positional data of the measuring head 8, and the second time T2, at which the measuring head 8 measures the workpiece 9, synchronize, as shown at H in FIG. 6.

A process of measuring the workpiece 9 with the workpiece measuring apparatus 20 will be described below.

First, the measuring head 8 is called by a measuring program. Then, the measuring head 8 is installed on the main spindle 4 by the ATC 14 and is positioned at the starting point of a measuring (scanning) process.

Then, the NC apparatus 13, the controller 25, the control device 23 and the transceiver 22 are readied for the measuring process by an M code command of the measuring program. The measuring head 8 then starts moving above the workpiece 9 according to a motion command of the measuring program.

The controller 25 reads present X-axis, Y-axis and Z-axis positional information 53, 54 and 55 (positional data) of the measuring head 8 from the NC apparatus 13 at the time intervals ΔT of 16 msec. according to the signal Pa from the clock 17. The controller 25 stores the read positional data into the buffer memory 16 at first time T1.

At the same time that the controller 25 reads the positional data, the pulse output unit 24 outputs a timing pulse P to the transceiver 22. Since the timing pulse P is delayed while it is traveling through the cable 60, the timing pulse P is applied to the transceiver 22 with the corresponding delay time.

When the transceiver 22 receives a first timing pulse Po, the transceiver 22 supplies the first timing pulse Po as a measurement start command to the measuring head 8, which then starts the measuring process. Thereafter, the transceiver 22 sends the measurement command f to the measuring head 8.

The transceiver 22 positively advances the measurement command f from the timing of the time intervals ΔT by the time difference n which is preset by the predictive system 29, and outputs the advanced measurement command f to the measuring head 8. The timing pulses P which are successively output from the pulse output unit 24 are used to keep the timing of the measurement command f for thereby preventing the measurement command f from deviating in time. Specifically, the measurement command f tends to lose its proper timing over a long period of time after the measuring process has started, and the timing pulses P are used to prevent the measurement command f from losing its proper timing.

When the measuring head 8 receives the measurement command f from the transceiver 22, the measuring head 8 measures the distance D from the measuring head 8 to the workpiece 9, and sends the measured data representative of the distance D to the transceiver 22. Specifically, the signal F representative of the measurement command f output from the transceiver 22 is sent to the measuring head 8 via the wireless link, and is processed in the measuring head 8. After the elapse of a time Δn1 which is required for the signal F to be transmitted via the wireless link and to be processed in the measuring head 8, the measuring head 8 measures the distance D at the second time T2 according to the measurement command f.

The time difference n is preset such that the timing for the measuring head 8 to measure the distance D and the timing for the controller 25 to read the positional data C1 of the measuring head 8 are held in synchronization, as shown at H in FIG. 6.

As a result, the first time T1 and the second time T2 are in conformity with each other. In other words, the measuring process of the measuring head 8 and the positional data reading process of the controller 25 are performed with the same timing.

The transceiver 22 sends the measured data B1 received from the measuring head 8 to the control device 23. The control device 23 successively stores the measured data B1 into the measured data storage unit 21.

Each time the controller 25 reads one of the positional data C1 of the measuring head 8 from the NC apparatus 13 and stores it into the buffer memory 16, the controller 25 increments the numerical value of the counter (memory address counter, latest address counter) 38 by one. The controller 25 holds the last address, which has been written, in the buffer memory 16.

The control device 23 successively reads the positional data C1 from the buffer memory 16, and successively stores the read positional data C1 into the positional data storage unit 26. Initially, the start address memory (counter) 37 stores the leading address of the positional data to be read from the buffer memory 16. At each time the control device 23 reads one of the positional data C1 from the buffer memory 16, the address stored in the start address memory 37 is updated. The final address of the positional data to be read from the buffer memory 16 is indicated by the counter 38 in the controller 25.

The control device 23 outputs a command for finishing the measuring process to the controller 25 when an M code command of the measuring program is output. The measuring process performed by the workpiece measuring apparatus 20 is now finished, and the pulse output unit 24 stops outputting the timing pulses P.

The control device 23 judges that the measuring process has been finished when the pulse output unit 24 stops outputting the timing pulses P and when the transceiver 22 receives no timing pulses after a preset time ΔT of 16 msec.

The control device 23 deletes the first one of the positional data C1 stored in the positional data storage unit 26 because there is no measured data corresponding to the first positional data at the start of the measuring process.

The control device 23 deletes the last one of the measured data B1 stored in the measured data storage unit 21 because there is no positional data corresponding to the last measured data.

Then, the processor 27 calculates two-dimensional or three-dimensional shape data of the workpiece 9 based on the positional data C1 and the measured data B1.

According to the present embodiment, the transceiver 22 and the control device 23 may process a minimum required number of measured data B1. Therefore, the burden imposed on the transceiver 22 and the control device 23 for processing the measured data B1 may be small, and hence each of the measured data storage unit 21 and the positional data storage unit 26 may have a small storage capacity.

Since the NC apparatus 13 incorporates the buffer memory 16 therein, the positional data C1 of the measuring head 8 in the three mutually transverse axes directions, i.e., the X-, Y- and Z-axis directions can temporarily be stored in the buffer memory 16.

Thereafter, a plurality of positional data C1 can be stored altogether into the positional data storage unit 26 according to commands output from the start address memory 37 and commands output from the counter 38. Consequently, the burden imposed on the controller 25, the buffer memory 16 and the control apparatus 23 for processing the positional data C1 may be small.

The processor 27 processes the minimum required number of measured data B1, which are stored in the measured data storage unit 21, and the positional data C1 of the measuring head 8 in the three mutually transverse axes directions which are stored in the positional data storage unit 26 to generate two-dimensional or three-dimensional shape data of the workpiece 9.

In this manner, the processor 27 calculates data representing the coordinates of a number of measured points S on the workpiece 9, i.e., the two-dimensional or three-dimensional shape data of the workpiece 9. The processor 27 then outputs the calculated coordinate data of the measured points S to a processing device 28, such as a personal computer or the like, which is separate from the control apparatus 23. The processing device 28 combines the coordinates of the measured points S to produce a three-dimensional representation or shape E (see FIG. 7) of the workpiece 9.

FIG. 8 shows the data of the measured distance D (the measured data B1) supplied from the transceiver 22 to the control device 23, the positional data C1 in the three mutually transverse axes directions supplied from the controller 25 to the control device 23, and the coordinate data calculated by the processor 27 based on the data of the measured distance D and the positional data C1. The calculated coordinate data represent three-dimensional shape data, i.e., the coordinates of the measured points S on the workpiece 9.

As described above, the workpiece measuring apparatus 20 controls the measuring head 8 to measure the workpiece 9 according to the measurement command f which is output positively earlier than the timing of the time intervals ΔT by the time difference n which is preset by the predictive system 29.

As a result, the first time T1 at which the controller 25 acquires the positional data C1 of the measuring head 8 and the second time T2 at which the measuring head 8 measures the workpiece 9 according to the measurement command f synchronize.

The control device 23 processes the positional data C1 of the measuring head 8 in the three mutually transverse axes directions and the minimum required number of measured data B1 to produce two-dimensional or three-dimensional shape data of the workpiece 9. As a result, a highly accurate two-dimensional or three-dimensional shape of the workpiece 9 is determined.

The measuring head 8 measures the workpiece 9 in non-contact therewith. After the measuring head 8 is automatically mounted on the main spindle 4 of the machine tool 1 by the ATC 14, therefore, the measuring head 8 can be moved to scan the workpiece 9 safely at a high speed in a vibration-free or low-vibration environment for thereby measuring the workpiece 9 over a wide surface range thereof within a short period of time.

In the above embodiment, the pulse output unit 24 outputs the timing pulses P at the pulse intervals ΔT1 of 16 msec. As the timing pulses P are used to determine times for acquiring measured data, the pulse intervals ΔT1 and intervals for measuring are not limited to any values, but may be of any desired values.

As described above, when the pulse output unit 24 stops outputting the timing pulses P to the transceiver 22, the transceiver 22 judges that the measuring process is put to an end provided it receives no timing pulses after a preset time ΔT of 16 msec.

It is assumed that the preset time ΔT is of a longer value, e.g., 160 msec. When the control device 23 outputs a command for finishing the measuring process to the controller 25, the transceiver 22 keeps acquiring and outputting the measured data B1 to the control device 23 until the transceiver 22 recognizes that it receives no timing pulses P after the preset time ΔT of 160 msec. As a result, the measured data B1 sent to the control device 23 immediately before the measuring process is finished become useless.

To avoid the above shortcoming, the control device 23 sends a command for finishing the measuring process not only to the controller 25, but also to the transceiver, so that the transceiver 22 can stop acquiring and outputting the measured data B1 when it receives the command for finishing the measuring process. Consequently, the measured data B1 will not be uselessly sent to the control device 23 immediately before the measuring process is finished.

A modification of the above embodiment of the present invention will be described below.

A machine tool according to the modification, which incorporates the workpiece measuring apparatus 20 therein, is capable of performing a three-axis control process, for linearly moving the measuring head 8 and the workpiece 9 in the three mutually transverse axes directions relatively to each other, and at least one-axis control process, e.g., a B-axis control process, for swiveling and indexing the measuring head 8 and the workpiece 9 relatively to each other.

The machine tool with the workpiece measuring apparatus 20 incorporated therein can swivel the measuring head 8 and the workpiece 9 relatively to each other. Therefore, the measuring head 8 can freely measure an upper surface, side surfaces and a slanted surface of the workpiece 9 over a wide surface range thereof in a two-dimensional or three-dimensional space.

Figure 9:
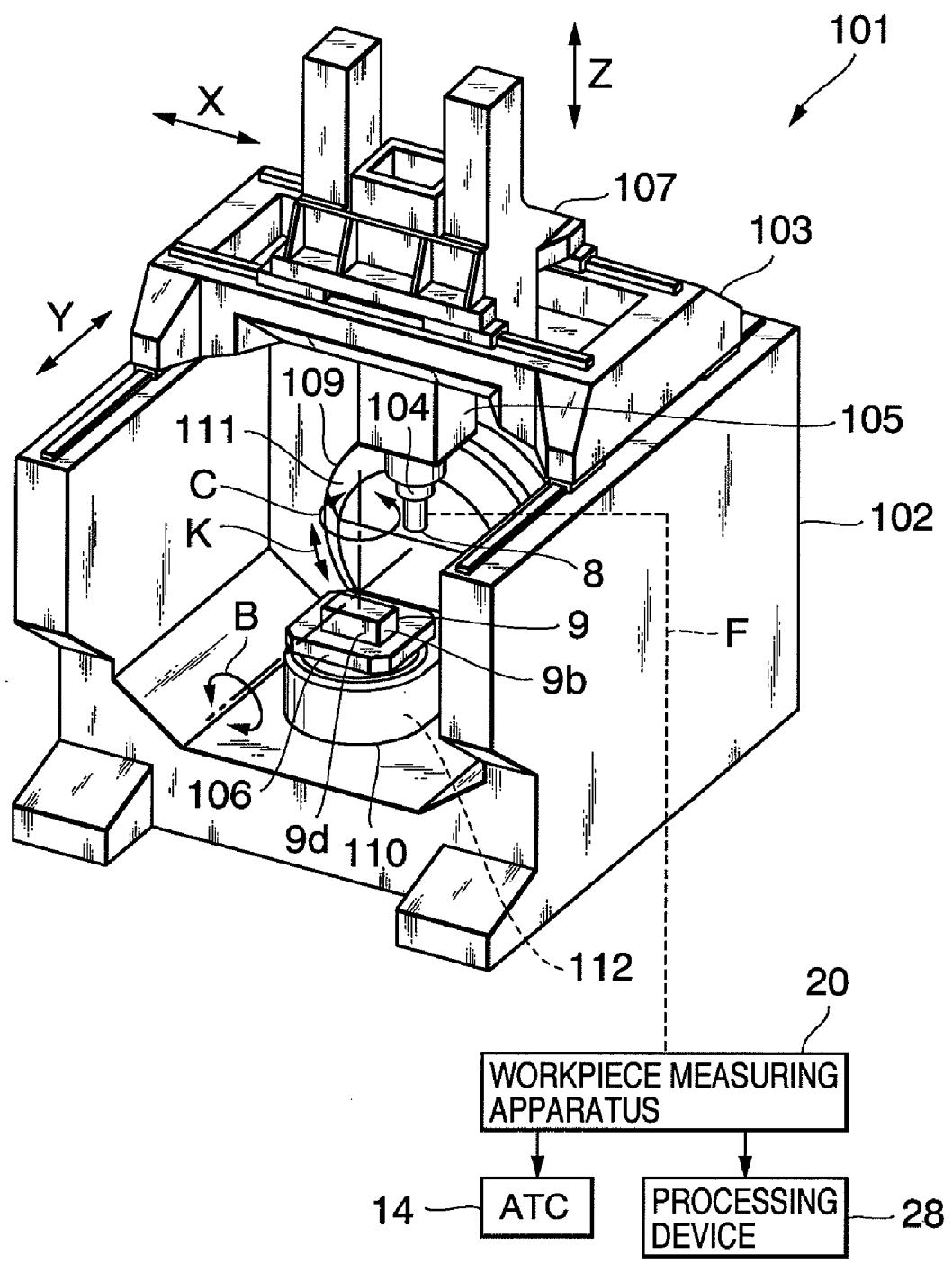
FIG. 9 is a perspective view of a machine tool according to a modification of the present invention which incorporates the workpiece measuring apparatus therein.
Figure 10A:
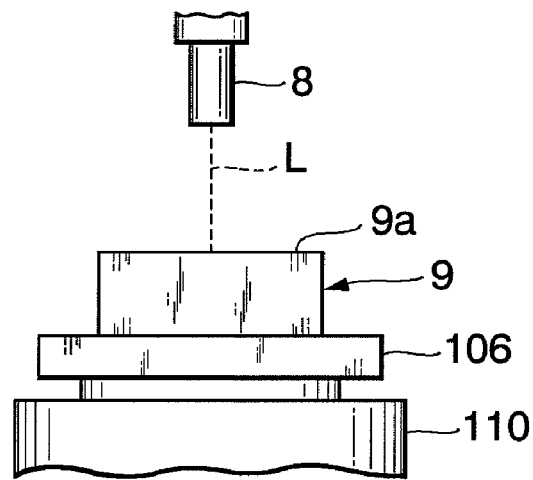
FIG. 10A is an elevational view showing a mode of measuring operation in which a measuring head of the workpiece measuring apparatus combined with the machine tool according to the modification measures a workpiece.
Figure 10B:
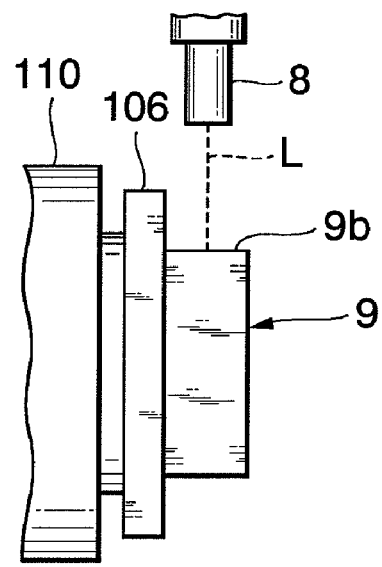
FIG. 10B is an elevational view showing another mode of measuring operation in which the measuring head of the workpiece measuring apparatus combined with the machine tool according to the modification measures the workpiece.
Figure 10C:
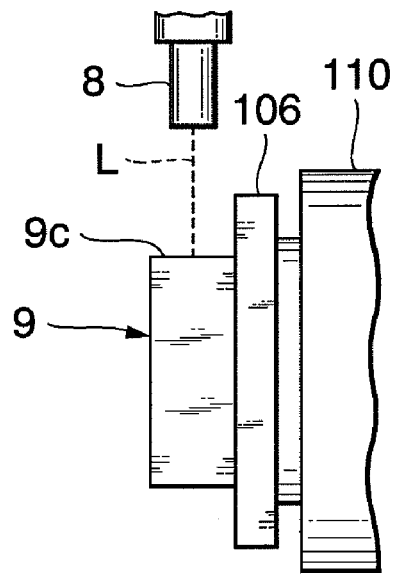
FIG. 10C is an elevational view showing still another mode of measuring operation in which the measuring head of the workpiece measuring apparatus combined with the machine tool according to the modification measures the workpiece.
Figure 10D:
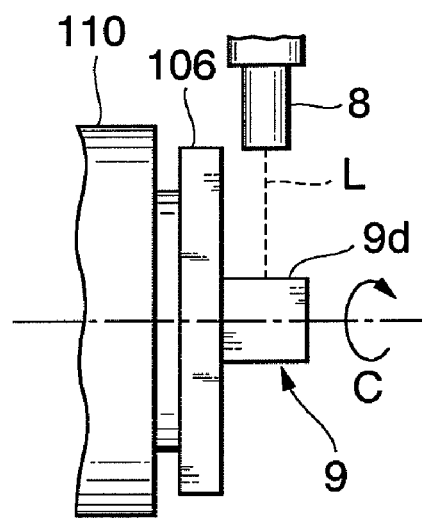
FIG. 10D is an elevational view showing yet another mode of measuring operation in which the measuring head of the workpiece measuring apparatus combined with the machine tool according to the modification measures the workpiece.
Figure 10E:
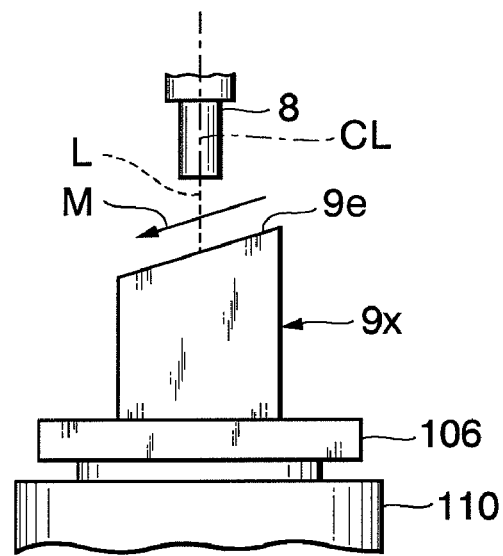
FIG. 10E is an elevational view showing yet still another mode of measuring operation in which the measuring head of the workpiece measuring apparatus combined with the machine tool according to the modification measures another workpiece.
Figure 10F:
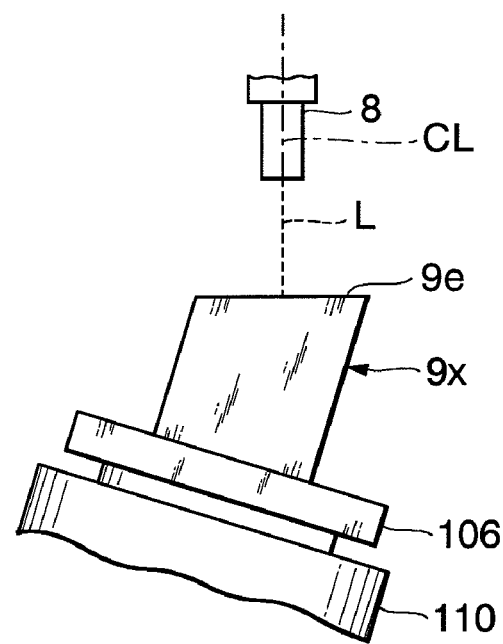
FIG. 10F is an elevational view showing a still further mode of measuring operation in which the measuring head of the workpiece measuring apparatus combined with the machine tool according to the modification measures the workpiece.

FIGS. 9 through 10F are views illustrative of the modification of the above embodiment. FIG. 9 is a perspective view of a machine tool 101 according to the modification of the present invention, which incorporates the workpiece measuring apparatus 20 therein. FIGS. 10A through 10F are elevational views showing modes of operation in which the measuring head 8 of the workpiece measuring apparatus according to the modification measures the workpiece.

The machine tool 101 shown in FIG. 9 comprises a five-axis turning center which is basically a five-axis-control vertical machining center serving as a multi-axis turning center for at least turning a workpiece 9, 9x.

The five-axis-control machine tool 101 performs a three-axis control process for linearly moving the measuring head 8 and the workpiece 9, 9x in the three mutually transverse axes directions, i.e., X-axis, Y-axis and Z-axis directions, relatively to each other and at least one-axis control process (in the illustrated modification, e.g., a B-axis control process and a C-axis control process), for swiveling the measuring head 8 and the workpiece 9, 9x relatively to each other.

The machine tool 101 comprises a base 102, a column 103 mounted on the base 102, a cross rail 107 mounted on the column 103, and a spindle head 105 attached to the cross rail 107 and having a main spindle 104. The machine tool 101 is controlled by an NC apparatus 13 (see FIG. 2).

The column 103 is movable on the base 102 horizontally in longitudinal directions of the machine tool 101, i.e., in the Y-axis directions. The cross rail 107 is movable on the column 103 horizontally transversely of the machine tool 101, i.e., in the X-axis directions. The spindle head 105 is movable on the cross rail 107 in vertical directions of the machine tool 101, i.e., in the Z-axis directions. The X-axis, Y-axis and Z-axis directions, also referred to as an X-axis, a Y-axis, and a Z-axis, respectively, serve as the three mutually transverse axes directions in which the measuring head 8 and the workpiece 9, 9x are linearly movable.

A tool, not shown, or the measuring head 8 is detachably mounted on the lower distal end of the main spindle 104. The main spindle 104 is supported on the spindle head 105 for rotation about its own central axis which extends parallel to the Z-axis.

The column 103 on the base 102 is movable in the Y-axis directions by a Y-axis feed mechanism. The cross rail 107 on the column 103 is movable in the X-axis directions by an X-axis feed mechanism. The spindle head 105 on the cross rail 107 is movable in the Z-axis directions by a Z-axis feed mechanism.

The measuring head 8 is thus linearly movable in the three mutually transverse axes directions, i.e., along the X-axis, the Y-axis, and the Z-axis, relatively to the workpiece 9, 9x.

The machine tool 101 has a table 106 which can be swiveled in the B-axis control process and can be rotated in the C-axis control process. Specifically, the table 106 can be swiveled and indexed about a B-axis parallel to the Y-axis in the B-axis control process, and can be rotated and indexed about a C-axis, which is a rotational center of the table 106, in the C-axis control process. The table 106 can thus orient the workpiece 9, 9x mounted thereon about the B-axis and the C-axis with respect to the measuring head 8.

Alternatively, the spindle head 105 may be swiveled with respect to the table 106 in the B-axis control process and may be rotated with respect to the table 106 in the C-axis control process.

A swiveling plate 109 which can be swiveled about the B-axis in the B-axis control process as indicated by the arrow K is mounted on the base 102. The table 106 is supported on a table support base 110 which projects forwardly from the swiveling plate 109.

The machine tool 101 includes a table actuating assembly for swiveling and rotating the table 106 in the B-axis control process and the C-axis control process. Specifically, the table actuating assembly comprises a B-axis actuator 111 combined with the swiveling plate 109 for swiveling the table 106 in the B-axis control process and a C-axis actuator 112 combined with the table support base 110 for rotating the table 106 in the C-axis control process.

When the B-axis actuator 111 is energized, it swivels and indexes the swiveling plate 109, the table support base 110, the table 106 and the workpiece 9, 9x about the B-axis with respect to the measuring head 8.

When the C-axis actuator 112 is energized, it rotates the table 106 and the workpiece 9, 9x mounted thereon about the C-axis to index the workpiece 9, 9x through a desired angular interval or continuously with respect to the measuring head 8.

For turning the workpiece 9, 9x with a turning tool mounted on the main spindle 104, the C-axis actuator 112 is energized to continuously rotate the table 106 and the workpiece 9, 9x mounted thereon about the C-axis in the C-axis control process. When the workpiece 9, 9x is rotated about the C-axis at a predetermined rotational speed, the workpiece 9, 9x is machined by the turning tool on the main spindle 104.

For cutting the workpiece 9, 9x with a rotating tool mounted on the main spindle 104, the C-axis actuator 112 is energized to angularly move and index the table 106 and the workpiece 9, 9x mounted thereon to a predetermined angular position about the C-axis in the C-axis control process. The workpiece 9, 9x on the table 106 is machined by the rotating tool on the main spindle 104 when the main spindle 104 is rotated.

The workpiece measuring apparatus 20 incorporated in the machine tool 101 is identical in configuration to the workpiece measuring apparatus 20 incorporated in the machine tool 1.

With the workpiece measuring apparatus 20 incorporated in the machine tool 101 and a workpiece measuring method which is carried out by the workpiece measuring apparatus 20, the measuring head 8 which is detachably mounted on the main spindle 104 can measure the workpiece 9, 9x in non-contact therewith or in contact therewith.

If the workpiece 9 is of a rectangular shape, then, as shown in FIG. 10A, the B-axis actuator 111 and the C-axis actuator 112 are controlled to position the table 106 in a horizontal plane. While the workpiece 9 is not being swiveled, the measuring head 8 can measure an upper surface 9a of the workpiece 9 mounted on the table 106.

Then, in another mode of measuring operation, the B-axis actuator 111 is energized to swivel the swiveling plate 109, the table support base 110, the table 106 and the workpiece 9 from the angular position shown in FIG. 10A through +90 degrees to an angular position shown in FIG. 10B about the B-axis in the B-axis control process. The measuring head 8 can now measure a first side surface 9b of the workpiece 9 mounted on the table 106.

In still another mode of measuring operation, the B-axis actuator 111 is energized to swivel and index the swiveling plate 109, the table support base 110, the table 106 and the workpiece 9 from the angular position shown in FIG. 10A through +270 degrees to an angular position shown in FIG. 10C about the B-axis in the B-axis control process. The measuring head 8 can now measure a second side surface 9c, which is diagonally opposite to the first side surface 9b, of the workpiece 9 mounted on the table 106.

While in the angular position shown in FIG. 10B or 10C, the C-axis actuator 112 is energized to swivel and index the swiveling plate 109, the table support base 110, the table 106 and the workpiece 9 mounted thereon through 90 degrees to an angular position shown in FIG. 10D about the C-axis in the C-axis control process. The measuring head 8 can now measure a third side surface 9d, which lies perpendicularly to the first and second side surfaces 9b and 9c, of the workpiece 9 mounted on the table 106.

The machine tool 101 performs the B-axis control process for swiveling and indexing the workpiece 9, 9x about the B-axis. Therefore, even if the workpiece 9x has a slanted surface 9e as shown in FIGS. 10E and 10F, the measuring head 8 can measure the slanted surface 9e of the workpiece 9x which is inclined to the central axis CL of the measuring head 8.

For example, in yet still another mode of measuring operation shown in FIG. 10E, the table 106 is positioned in a horizontal plane without being swiveled in the B-axis control process. For measuring the slanted surface 9e of the workpiece 9x, the measuring head 8 is moved along the slanted surface 9e in the direction indicated by the arrow M. The measuring head 8 measures the slanted surface 9e while applying the laser beam L obliquely to the slanted surface 9e.

In a still further mode of measuring operation shown in FIG. 10F, the table 106 is swiveled in the B-axis control process by the B-axis actuator 111 to incline the workpiece 9x to position the slanted surface 9e in a horizontal plane. The measuring head 8 measures the slanted surface 9e while applying the laser beam L perpendicularly to the slanted surface 9e.

With the workpiece measuring apparatus 20 incorporated in the five-axis-control machine tool 101, the measuring head 8 can freely measure any of various surfaces of the workpiece 9, 9x including the upper surface 9a, the side surfaces 9b, 9c, 9d and the slanted surface 9e for thereby measuring the workpiece 9, 9e over a wider surface range thereof in a two-dimensional or three-dimensional space.

The workpiece measuring apparatus 20 incorporated in the five-axis-control machine tool 101 operates in the same manner and offers the same advantages as the workpiece measuring apparatus 20 incorporated in the machine tool 1.

The workpiece measuring apparatus and the workpiece measuring method according to the present invention are applicable to various machine tools including lathes, turning machines and grinding machines as well as machining centers and multi-axis turning centers, for measuring workpieces in noncontact therewith or in contact therewith.

Although certain preferred embodiments of the present invention have been shown and described in detail, it should be understood that various changes and modifications may be made therein without departing from the scope of the appended claims.

What is claimed is:

1. A workpiece measuring apparatus for measuring a workpiece on a machine tool, comprising:
   a numerical control apparatus for controlling the machine tool;
   a measuring head detachably mounted on a main spindle of the machine tool, for measuring the workpiece on the machine tool;
   a transceiver for sending and receiving signals and data between itself and said measuring head; and
   a control device for controlling said workpiece measuring apparatus;
   wherein said workpiece measuring apparatus comprises:
   a programmable controller for acquiring positional data of said measuring head, with respect to measured points on the workpiece, in at least two-axis directions including a first axis direction and a second axis direction, along which said measuring head scans said workpiece, at predetermined time intervals from said numerical control apparatus; and
   a pulse output unit for outputting timing pulses at pulse intervals corresponding to said predetermined time intervals to said transceiver;
   wherein said programmable controller acquires the positional data of said measuring head;
   said pulse output unit outputs said timing pulses at the same time that said programmable controller acquires the positional data of said measuring head; and
   said measuring head measures said workpiece according to a measurement command which is output positively earlier than the timing of the predetermined time intervals by a time difference which is preset by a predictive system and which is kept in timed relation to the timing pulses;
   whereby a first time at which said programmable controller acquires the positional data of said measuring head and a second time at which said measuring head measures the workpiece in response to the measurement command synchronize.

2. A workpiece measuring apparatus for measuring a workpiece on a machine tool, comprising:
   a numerical control apparatus for controlling the machine tool;
   a measuring head detachably mounted on a main spindle of the machine tool, for measuring the workpiece on the machine tool;
   a transceiver for sending and receiving signals and data between itself and said measuring head; and
   a control device for controlling said workpiece measuring apparatus;
   wherein said workpiece measuring apparatus comprises:
   a programmable controller for acquiring positional data of said measuring head, with respect to measured points on the workpiece, in at least two-axis directions including a first axis direction and a second axis direction, along which said measuring head scans said workpiece, at predetermined time intervals from said numerical control apparatus; and
   a pulse output unit for outputting timing pulses at pulse intervals corresponding to said predetermined time intervals to said transceiver;
   wherein said programmable controller acquires the positional data of said measuring head;
   said pulse output unit outputs said timing pulses at the same time that said programmable controller acquires the positional data of said measuring head;
   said measuring head measures said workpiece according to a measurement command which is output positively earlier than the timing of the predetermined time intervals by a time difference which is preset by a predictive system and which is kept in timed relation to the timing pulses;
   whereby a first time at which said programmable controller acquires the positional data of said measuring head and a second time at which said measuring head measures the workpiece in response to the measurement command synchronize, so that said programmable controller acquires said positional data and said measuring head measures said workpiece, at the time of the acquisition of the positional data by the programmable controller, repeatedly with identical timing at all times and at said predetermined time intervals;
   said programmable controller outputs said positional data of said measuring head acquired thereby to said control device;
   said transceiver receives measured data from said measuring head after the transceiver has transmitted said measurement command to said measuring head, and outputs the received measured data to said control device; and
   said control device processes said positional data and said measured data to generate two-dimensional or three-dimensional shape data of said workpiece.

3. A workpiece measuring apparatus according to claim 1 or 2, wherein said programmable controller includes a buffer memory for temporarily storing said positional data of the measuring head; and
   when said programmable controller acquires said positional data of the measuring head, the programmable controller temporarily stores the positional data into said buffer memory and thereafter outputs the positional data from said buffer memory to said control device.

4. A workpiece measuring apparatus according to claim 3, wherein said control device comprises:
   a measured data storage unit for storing said measured data;
   a positional data storage unit for successively reading said positional data acquired by said programmable controller and stored in said buffer memory, according to commands from a start address memory included in said control device and commands from a counter included in said buffer memory, and for storing the positional data successively read from said buffer memory; and
   a processor for processing said measured data stored in said measured data storage unit and said positional data stored in said positional data storage unit.

5. A workpiece measuring apparatus according to claim 1 or 2,
wherein said measuring head measures a distance from the measuring head to said workpiece for thereby measuring said workpiece in noncontact therewith in response to said measurement command.

6. A workpiece measuring apparatus according to claim 1 or 2, wherein said predictive system is included in said transceiver or said measuring head.

7. A workpiece measuring apparatus according to claim 1 or 2,
wherein said machine tool comprises a multi-axis turning center for performing a three-axis control process for linearly moving said measuring head and said workpiece in the three mutually transverse axes directions relatively to each other, and at least one-axis control process for swiveling and indexing said measuring head and said workpiece relatively to each other.

8. A workpiece measuring apparatus according to claim 7, wherein said measuring head measures said workpiece when the workpiece is inclined to a central axis of the measuring head.

9. A workpiece measuring apparatus according to claim 1 or 2,
wherein said measuring head is automatically changeable on said main spindle by an automatic tool changer; and
while said workpiece is being machined by a tool mounted on said main spindle or after said workpiece is machined by a tool mounted on said main spindle, the tool is replaced with said measuring head and said workpiece is measured by said measuring head, or after said workpiece is measured by said measuring head, said measuring head is replaced with a tool and said workpiece is machined by the tool, so that a machining process on said workpiece is followed by a measuring process on said workpiece, or vice versa.

10. A method of measuring a workpiece with a workpiece measuring apparatus, said workpiece measuring apparatus comprising:
a numerical control apparatus for controlling a machine tool;
a measuring head detachably mounted on a main spindle of the machine tool, for measuring the workpiece on the machine tool;
a transceiver for sending and receiving signals and data between itself and said measuring head;
a control device for controlling said workpiece measuring apparatus;
a programmable controller for acquiring positional data of said measuring head, with respect to measured points on the workpiece, in at least two-axis directions including a first axis direction and a second axis direction, along which said measuring head scans said workpiece, at predetermined time intervals from said numerical control apparatus; and
a pulse output unit for outputting timing pulses at pulse intervals corresponding to said predetermined time intervals to said transceiver,
said method comprising the steps of:
acquiring the positional data of said measuring head with said programmable controller;
outputting said timing pulses from said pulse output unit at the same time that said programmable controller acquires the positional data of said measuring head; and
measuring said workpiece with said measuring head according to a measurement command which is output positively earlier than the timing of the predetermined time intervals by a time difference which is preset by a predictive system and which is kept in timed relation to the timing pulses;
whereby a first time at which said programmable controller acquires the positional data of said measuring head and a second time at which said measuring head measures the workpiece in response to the measurement command synchronize.

11. A method of measuring a workpiece with a workpiece measuring apparatus, said workpiece measuring apparatus comprising:
a numerical control apparatus for controlling a machine tool;
a measuring head detachably mounted on a main spindle of the machine tool, for measuring the workpiece on the machine tool;
a transceiver for sending and receiving signals and data between itself and said measuring head;
a control device for controlling the workpiece measuring apparatus;
a programmable controller for acquiring positional data of said measuring head, with respect to measured points on the workpiece, in at least two-axis directions including a first axis direction and a second axis direction, along which said measuring head scans said workpiece, at predetermined time intervals from said numerical control apparatus; and
a pulse output unit for outputting timing pulses at pulse intervals corresponding to said predetermined time intervals to said transceiver,
said method comprising the steps of:
acquiring the positional data of said measuring head with said programmable controller;
outputting said timing pulses from said pulse output unit at the same time that said programmable controller acquires the positional data of said measuring head;
measuring said workpiece with said measuring head according to a measurement command which is output positively earlier than the timing of the predetermined time intervals by a time difference which is preset by a predictive system and which is kept in timed relation to the timing pulses;
whereby a first time at which said programmable controller acquires the positional data of said measuring head and a second time at which said measuring head measures the workpiece in response to the measurement command synchronize, so that said programmable controller acquires said positional data and said measuring head measures said workpiece at the time of the acquisition of the positional data by the programmable controller, repeatedly with identical timing at all times and at said predetermined time intervals;
outputting said positional data acquired by said programmable controller to said control device;
receiving measured data from said measuring head with said transceiver after the transceiver has transmitted said measurement command to said measuring head, and outputting the received measured data to said control device; and
processing said positional data and said measured data with said control device to generate two-dimensional or three-dimensional shape data of said workpiece.

* * * * *